(12) United States Patent
Pong

(10) Patent No.: US 7,885,268 B2
(45) Date of Patent: Feb. 8, 2011

(54) METHOD AND SYSTEM FOR HASH TABLE BASED ROUTING VIA TABLE AND PREFIX AGGREGATION

(75) Inventor: Fong Pong, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 522 days.

(21) Appl. No.: 11/776,660

(22) Filed: Jul. 12, 2007

(65) Prior Publication Data

US 2008/0112413 A1 May 15, 2008

Related U.S. Application Data

(60) Provisional application No. 60/865,369, filed on Nov. 10, 2006.

(51) Int. Cl.
*H04L 12/28* (2006.01)
*H04L 12/56* (2006.01)

(52) U.S. Cl. .................. 370/395.32; 370/392; 711/216

(58) Field of Classification Search .............. 707/100, 707/3; 370/395.32, 428, 389, 255, 363, 395.2, 370/392, 395.31; 711/108, 216
See application file for complete search history.

(56) References Cited

U.S. PATENT DOCUMENTS

| | | | | |
|---|---|---|---|---|
| 6,141,738 A * | 10/2000 | Munter et al. | ............... | 711/206 |
| 6,611,832 B1 * | 8/2003 | van Lunteren | ..................... | 1/1 |
| 6,631,419 B1 * | 10/2003 | Greene | ....................... | 709/238 |
| 6,735,670 B1 * | 5/2004 | Bronstein et al. | ............ | 711/108 |
| 7,089,240 B2 * | 8/2006 | Basso et al. | ......................... | 1/1 |
| 7,299,317 B1 * | 11/2007 | Panigrahy et al. | ............ | 711/108 |
| 7,304,994 B2 * | 12/2007 | Dubnicki et al. | ............ | 370/392 |
| 7,433,355 B2 * | 10/2008 | Wilson et al. | ............... | 370/392 |
| 7,443,841 B2 * | 10/2008 | Davis | ......................... | 370/356 |
| 7,483,430 B1 * | 1/2009 | Yuan et al. | ............... | 370/395.2 |
| 7,525,958 B2 * | 4/2009 | Kumar et al. | ............... | 370/386 |
| 7,602,785 B2 * | 10/2009 | Dharmapurikar et al. | ... | 370/392 |
| 7,653,670 B2 * | 1/2010 | Hasan et al. | ......... | 707/999.205 |
| 7,702,630 B2 * | 4/2010 | Basso et al. | .................. | 707/769 |
| 2002/0069232 A1 * | 6/2002 | Direen et al. | .................. | 708/400 |
| 2003/0065879 A1 * | 4/2003 | Krishna et al. | ............... | 711/108 |
| 2004/0085953 A1 * | 5/2004 | Davis | ......................... | 370/356 |
| 2005/0195832 A1 * | 9/2005 | Dharmapurikar et al. | ..................... | 370/395.31 |

\* cited by examiner

*Primary Examiner*—Michael J Moore, Jr.
(74) *Attorney, Agent, or Firm*—McAndrews, Held & Malloy, Ltd.

(57) ABSTRACT

Aspects of a method and system for hash table based routing via table and prefix aggregation are provided. Aspects of the invention may enable aggregating prefixes of varying lengths into a single hash table, wherein each entry in the hash table comprises one or more encoded bits to uniquely identify said prefixes. Additionally, an entry in a hash table may be formatted based on a length of one or more representations of said prefixes in the entry. Aggregating prefixes into a hash table may comprise truncating the prefixes to a common length. In this regard, the encoded bits may indicate the length of the prefixes prior to and/or subsequent to truncation. Additionally, the encoded bits may represent bits removed from the prefix during truncation. In this regard, an encoded bit may represent a possible combination of removed bits and may be asserted when the removed bits are equal to that combination.

36 Claims, 8 Drawing Sheets

METHOD AND SYSTEM FOR HASH TABLE BASED ROUTING VIA TABLE AND PREFIX AGGREGATION

CROSS-REFERENCE TO RELATED APPLICATIONS/INCORPORATION BY REFERENCE

This patent application makes reference to, claims priority to and claims benefit from U.S. Provisional Patent Application Ser. No. 60/865,369 filed on Nov. 10, 2006.

This application also makes reference to:
U.S. patent application Ser. No. 11/776,652 filed on Jul. 12, 2007.

Each of the above stated applications is hereby incorporated herein by reference in its entirety.

FIELD OF THE INVENTION

Certain embodiments of the invention relate to data processing. More specifically, certain embodiments of the invention relate to a method and system for hash table based routing via table and prefix aggregation.

BACKGROUND OF THE INVENTION

As the number of devices connected to data networks increase and higher data rates are required, there is a growing need for new technologies enabling higher transmission rates. In this regard, various efforts exist, including technologies that enable transmission rates that may even exceed Gigabits-per-second (Gbps) data rates. For example, the IEEE 802.3 standard defines the (Medium Access Control) MAC interface and physical layer (PHY) for Ethernet connections at 10 Mbps, 100 Mbps, 1 Gbps, and 10 Gbps data rates over twisted-pair copper cabling. Accordingly, as data rates increase due to widespread deployment of 1 Gbps and 10 Gbps Ethernet switches, fast IP address lookups have become indispensable for core and edge routers. Meanwhile, the number of prefixes in core routers has experienced explosive growth, with the largest border gateway protocol (BGP) routing table seeing, for example, a 40% surge in number of prefixes in a 12-month period. Earlier solutions to IP address lookups were tries-based through software execution to match an IP address progressively a few bits at a time against. In this regard, prefixes were stored in a tree-like data structure to support longest prefix matching (LPM), which chooses the longest prefix among those which matches the given IP address.

In contrast, hash tables offer an attractive method for fast IP lookups because of their constant-time search latencies. Hash tables are also attractive because they can be implemented in regular SRAM rather than TCAM. SRAM may be preferred over TCAM because SRAM is less expensive, more power efficient, and exhibits higher densities than TCAM.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for hash table based routing via table and prefix aggregation, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for hash table based routing via table and prefix aggregation.

Aspects of the invention may enable aggregating prefixes of varying lengths into a single hash table, wherein each entry in the hash table comprises one or more encoded bits to uniquely identify said prefixes. Additionally, an entry in the hash table may be formatted based on a length of one or more representations of said prefixes in the entry. Aggregating prefixes into the hash table may comprise truncating the prefixes to a common length. In this regard, the encoded bits may indicate the length of the prefixes prior to and/or subsequent to truncation. Additionally, the encoded bits may represent bits removed from the prefix during truncation. In this regard, an encoded bit may represent a possible combination of removed bits and may be asserted when the removed bits are equal to that combination.

Figure 1:
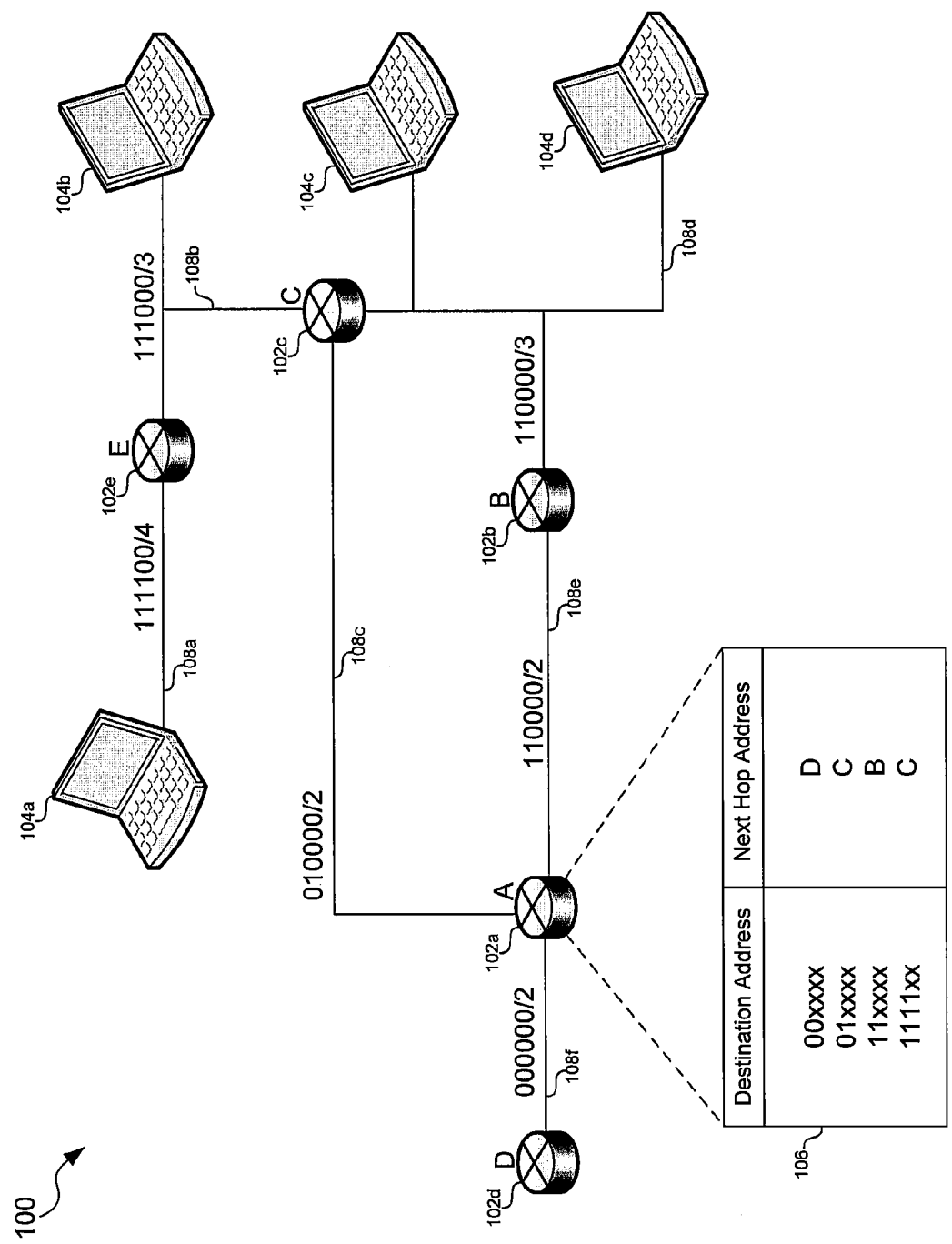
FIG. 1 is diagram of a network illustrating longest prefix matching, in connection with an embodiment of the invention.

FIG. 1 is diagram of a network illustrating longest prefix matching, in connection with an embodiment of the invention. Referring to FIG. 1, the network 100 may comprise a plurality of sub-networks 108, a plurality of routers 102, and a plurality of end systems 104. The routing table 106 comprising the router 102a is also shown. For simplicity, nodes connected to the network 100 are addressed utilizing a 6-bit address.

The sub-networks 108 may comprise logical connections identified by common bits comprising the 6-bit addresses associated with nodes connected to each sub-network. In this regard, each sub-network may be identified by 2 or more bits common to the nodes connected to it, where the number of bits is indicated following a slash. For example, the sub-network 108e may comprise nodes having 6-bit addresses beginning with '11$_b$'. Similarly, the sub-network 108a may couple nodes having 6-bit address beginning with '1111$_b$'.

The end systems 104 may comprise suitable logic, circuitry, and/or code that may enable transmission and/or reception of data via a network interface. In this regard, each of the end systems 104 may be assigned a unique address to identify them to other nodes comprising the network 100. The address of each of the end systems 104 may be assigned based on the sub-network to which each is connected. For example, the end-system 104a may be assigned a 6-bit address ranging from '111101$_b$' to '111111$_b$'.

The routers 102 may comprise suitable logic circuitry, and/or code that may enable reception of data via a plurality of network interfaces and forwarding of data onto a plurality of network interfaces. In this regard, each router 102 may, for example, enable data transmitted by the end system 104a to traverse the network 100 and arrive at the end system 104d. In this regard, each network interface comprising each of the routers 102 may be assigned a 6-bit address. Each of the routers 102 may utilize a routing table such as the routing table 106 to enable the forwarding of data in the network 100.

In an exemplary routing operation, a packet may arrive at the router 102a destined for '111011$_b$' (a node connected to the sub-network 108b). In order to forward this packet, the router 102a may determine the longest prefix comprising the table 106 that matches the destination address of '111011$_b$'. In this regard, a match is found in '11xxxx$_b$' and the packet may be forwarded to node B (router 102b).

In another exemplary routing operation, a packet may arrive at the router 102a destined for '111101$_b$' (a node connected to the sub-network 108a). In order to forward this packet, the router 102a may determine longest prefix comprising the table 106 that matches the destination address of '111101$_b$'. In this regard, a match is found in '1111xx$_b$' and the packet is forwarded to node C (router 102c).

Figure 2:
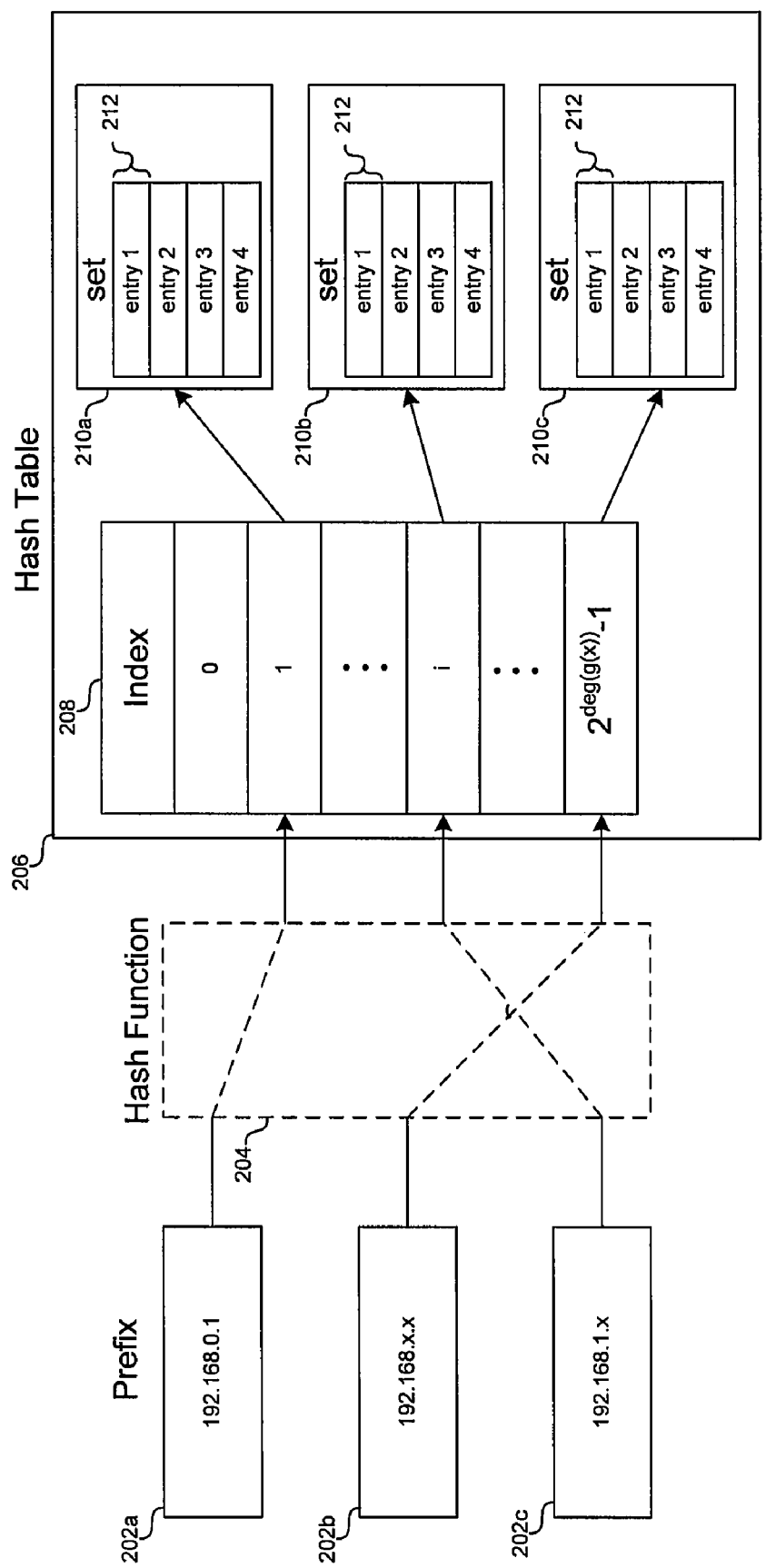
FIG. 2 illustrates a set-associative hash table indexed by a hash function that operates on network addresses, in accordance with an embodiment of the invention.

FIG. 2 illustrates a set-associative hash table indexed by a hash function that operates on network addresses, in accordance with an embodiment of the invention. Referring to FIG. 2, each prefix 202 may be mapped to an index 208 of a hash table 206 via a hash function 204. Each index 208 may correspond to a set 210 comprising one or more entries 212. In one embodiment of the invention, the table may be 4-way set-associative and thus each set 210 may comprise up to 4 entries 212.

The prefixes 202 may each represent an IP address or a network portion of an IP address. In this regard, the prefixes 202 may, for example, each be 8 to 32 bits in length for IPv4. Accordingly, in this example, up to 25 hash functions may be utilized to hash the prefixes 202 to an index 208.

The hash table 206 may comprise suitable logic, circuitry, and/or code that may enable storage of prefix representations. In this regard, the hash table 206 may be implemented in one or more RAM blocks, for example.

The hash function 204 may operate to hash a prefix to an index. Details of an exemplary hashing operation and associated prefix transformation may be found in the above referenced U.S. patent application Ser. No. 11/776,652 which is hereby incorporated herein in its entirety. In this regard, a prefix 202 may be hashed to an index by translating the prefix as a coefficient set of a polynomial, p(x), defined over the Galois Field GF(2), and dividing it by a primitive generator polynomial, g(x), to obtain a quotient, q(p/g), and a remainder, r(p/g). In this regard, the coefficients may be binary numbers and arithmetic may be performed modulo 2. The polynomial p(x) may be uniquely defined by the set (q(p/g), r(p/g)), and thus a prefix may be represented in the hash table 206, with no loss of information, by storing q(p/g) in a set indexed by r(p/g). In this regard, the hash table 206 may comprise $2deg(g(x))$ sets, where deg(g(x)) denotes the degree of the generator polynomial g(x). Accordingly, for a prefix of length 'w', q(pw/g) may be up to (w−deg(g(x))) bits long. Similarly, r(pw/g) may be up to deg(g(x)) bits long. For example, if g(x) is of degree 16, then a 32 bit (24 bit) prefix may result in a 16 bit remainder and a 16 bit (8 bit) quotient. In this example, one or more entries 212 of the table 210 may comprise only the 16 bit (8 bit) quotient rather than the complete 32 bit (24 bit) prefix. In this manner, a significant savings in memory required to store each entry 212, and thus the memory required to store the table 206, may be realized by transformation of prefixes into a quotient and a remainder.

Although choice of a proper generator polynomial may limit the occurrence of collisions, no hash function may be perfect and collisions may occur. In this regard, an associative degree of the table may be determined based on theoretical or empirically determined expectance of collisions. For example, as shown in FIG. 2, in various embodiments of the invention a 4-way set-associative table may be determined to be sufficient. Moreover, a small spillover RAM or TCAM may be utilized to handle the rare instances when more than 4 prefixes hash to the same index.

Figure 3:
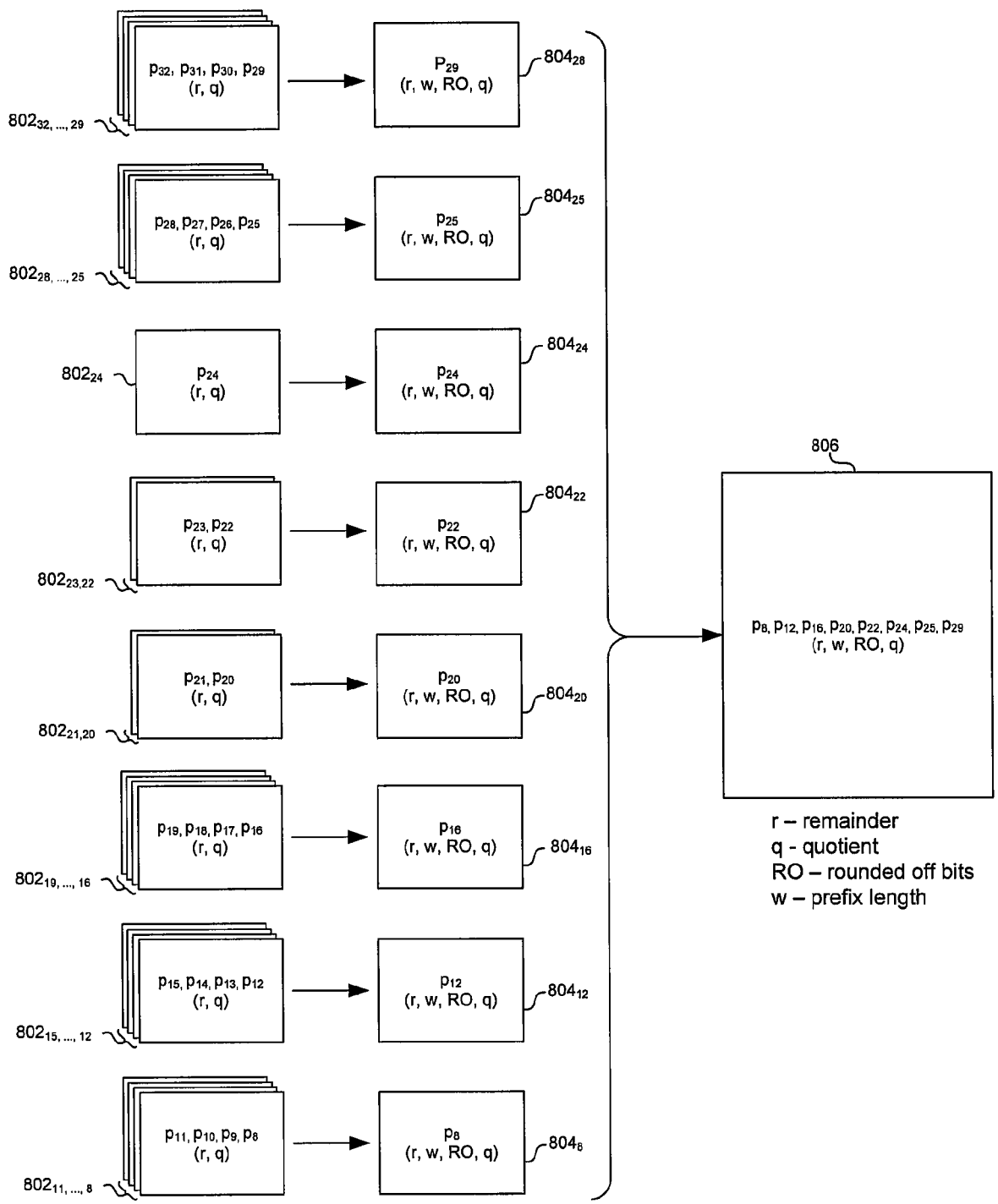
FIG. 3 is a block diagram illustrating the aggregation of multiple hash tables into a single hash table, in accordance with an embodiment of the invention.

FIG. 3 is a block diagram illustrating the aggregation of multiple hash tables into a single hash table, in accordance with an embodiment of the invention. Referring to FIG. 3 there is shown a first set of hash tables $802_{8, \ldots, 32}$, a second set of hash tables $804_{8, \ldots, 29}$, and an aggregated hash table 806.

Each of the hash tables $802_{8, \ldots, 32}$, herein referred to as $802_w$, where 'w' refers to a prefix length associated with the hash table, may comprise suitable logic, circuitry, and/or code that may enable storage of prefix representations. In this regard, the hash table $802_w$ may be implemented in one or more RAM blocks, for example. The hash table $802_w$ may comprise indexes ranging from 0 to ($2^{deg(g(x))-1}$). Moreover, each index comprising the hash table $802_w$ may be associated with a set of entries, and each entry may, in turn, comprise a quotient and a next hop address. Additionally, all entries in table 802w may represent prefixes of length 'w'. Accordingly, each of the plurality of hash tables $802_{8, \ldots, 32}$ may be similar to or the same as each of the hash tables 604 described in FIG. 6 of the U.S. patent application Ser. No. 11/776,652 referenced above.

Each of the hash tables $804_{8, \ldots, 29}$ (herein referred to as $804_t$, where 't' refers to a one of a defined set of lengths (treads) associated with the hash table) may comprise suitable logic, circuitry, and/or code that may enable storage of prefix representations. In this regard, the hash table $804_t$ may be similar to the table $802_w$, however, the table $804_t$ may differ in that prefixes of multiple lengths are represented in the table $804_t$. In this regard, a set of 'y' prefix lengths (herein referred to as treads) {$t_1, \ldots, t_y$} may be defined, where 'y' is a positive integer greater than 1. Accordingly, prefixes longer than or equal to '$t_i$' and shorter than '$t_{i+1}$', where '$t_i$' and '$t_{i+1}$' represent two consecutive treads, may be truncated to length '$t_i$' before calculation of r(p$_w$/g) and q(p$_w$/g) for 'w'='$t_i$'. In this manner, the number of hash tables may be reduced to 'y'. In the exemplary embodiment shown in FIG. 3, 'y' is equal to 8 and thus 25 hash tables may be aggregated into 8 hash tables.

In choosing the values of the treads for the tables $804_{8,\ldots,29}$, the expected distribution of prefixes may be taken into consideration. In the exemplary embodiment shown, the treads may be closer together for prefixes between 20 bits and 24 bits because these lengths may be more common in typical IPv4 networks. In this manner, one or two common prefix lengths may be represented in the hash tables $804_{20,22,24}$ while four of the less common prefix lengths may be represented in the hash tables $804_{8,12,16,25,29}$.

Because prefixes may be truncated to a tread 't' before calculation of the quotient and remainder, storage of $q(p_w/g)$ indexed by $r(p_w/g)$, for 'w'='t', may be insufficient to uniquely represent a prefix in the hash table $804_t$. For example, a 27 bit prefix and a 28 bit prefix may comprise the same 25 bit most significant bits and thus when truncated to 25 bits would be indistinguishable. In this regard, entries in the tables $804_t$ may additionally comprise one or more fields to indicate prefix length prior to truncation and/or bits removed from a prefix prior to truncation (herein referred to as rounded off bits). In this regard, possible encodings and/or formatting for table entries are described in FIG. 6A, 6B, 6C.

Although the tables $804_{8,\ldots,29}$ may improve memory utilization in comparison to the tables $802_{8,\ldots,32}$, memory efficiency may be further improved by treating the tables $804_{8,\ldots,29}$ as a logical concept while physically grouping them into a single hash table 806. In this manner, entries indexed by $r(p_t/g)$ may comprise $q(p_t/g)$ and one or more fields to indicate a length prior to truncation and/or rounded off bits. The table 806 may be implemented in a single memory device, for example in a RAM chip. Additionally, since prefixes of all lengths are stored in a single hash table, memory utilization is optimized without having to resort to more complex methods such as customized memory sizes and/or customized addressing schemes for each hash table.

Figure 4:
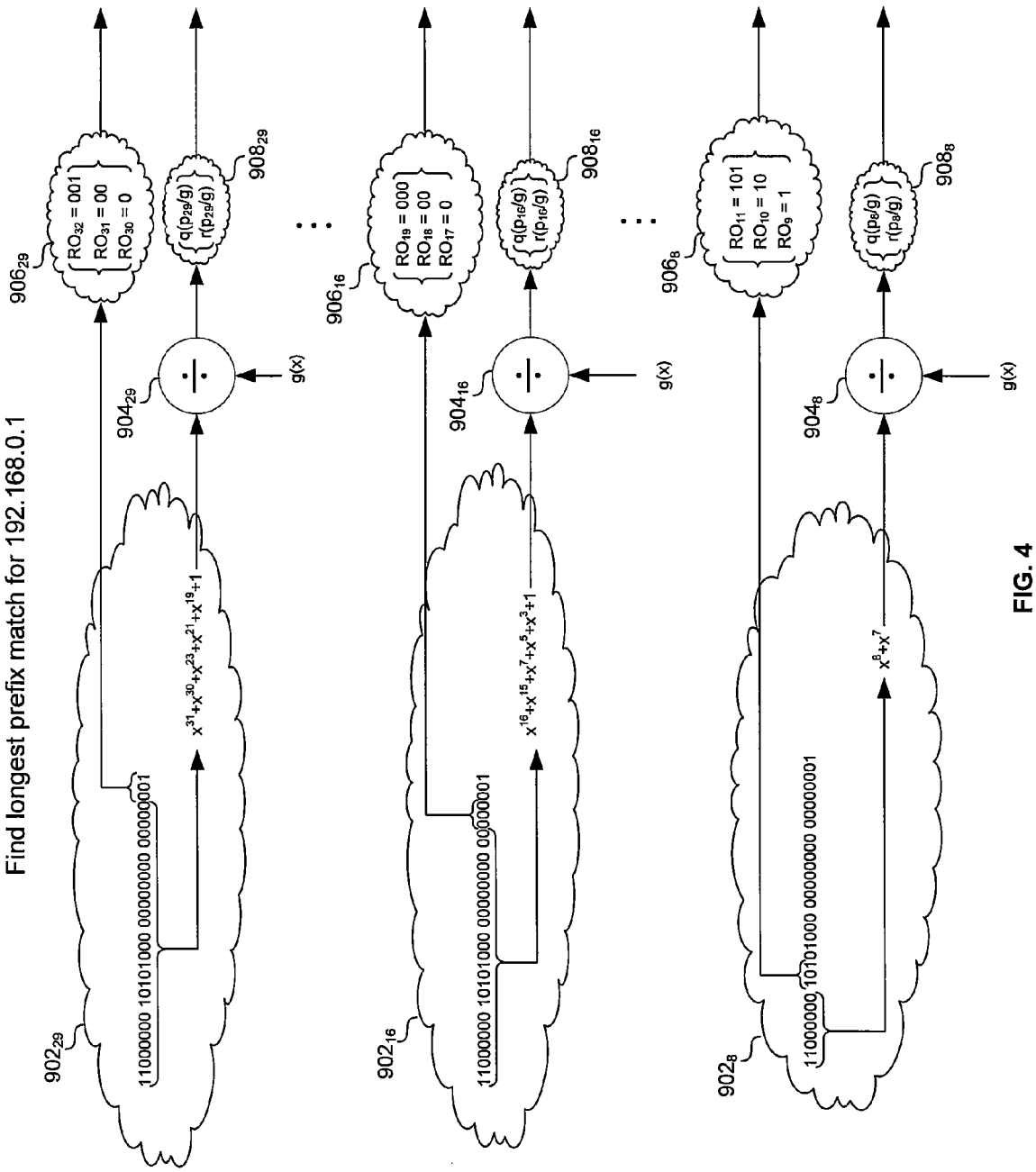
FIG. 4 illustrates prefix transformation and aggregation for hash table based IP lookup, in accordance with an embodiment of the invention.

FIG. 4 illustrates prefix transformation and aggregation for hash table based IP lookup, in accordance with an embodiment of the invention. Referring to FIG. 4 there is shown a plurality of prefixes $902_{8,\ldots,29}$, a plurality of binary division blocks $904_{8,\ldots,29}$, and a plurality of quotient/remainder pairs $908_{8,\ldots,29}$ with corresponding rounded off bit values $906_{8,\ldots,29}$.

Each of the prefixes 902 may represent a network portion of an IP address. In the exemplary embodiment shown, the IP address has an exemplary value of 192.168.0.1. In this regard, the network portion may vary in length from 8 bits to 32 bits (i.e. 8≦'w'≦32) and thus there are 25 possible prefix matches for the address 192.168.0.1. Although, an exemplary IP address of 32 bits with 25 possible prefix lengths is used for illustration, the invention is not limited in this regard. Accordingly, the present invention may utilize network addresses and/or prefixes of any length with any number of possible prefix lengths.

The binary division blocks 904 may comprise suitable logic, circuitry, and/or code that may enable modulo 2 division of p(x) by g(x). Accordingly, a number of algorithms may be utilized to calculate q(p/g) and r(p/g). In this regard, details of an exemplary hashing operation and associated prefix transformation may be found in the above referenced U.S. patent application Ser. No. 11/776,652 filed on even date herewith.

In operation, a longest prefix match may be determined for the exemplary IP address 192.168.0.1. To determine a longest prefix match, the address may be truncated to 'y' defined treads $\{t_1, \ldots, t_y\}$, where 'y' is a positive integer and 1≦'y'≦25. Accordingly, 'y' quotient/remainder pairs 908 and up to 25 rounded off bit values 906 may be calculated. A hash table similar to the hash table 806 disclosed in FIG. 3 may be accessed to find a longest prefix match. In this regard, aspects of the invention may enable determination of whether an entry comprising $q(p_t/g)$ resides in a set indexed by $r(p_t/g)$. In this manner, a matching $q(p_t/g)$ at $r(p_t/g)$ may only identify a match for the leading 't' bits of a prefix. Accordingly, for a prefix match, bits rounded off when truncating an address must be compared to rounded-off bits represented in a hash table entry. For example, in the exemplary embodiment shown, if a match is found for $q(p_{16}/g)$ at $r(p_{16}/g)$, and if the matching entry indicates 2 rounded-off bits of '$00_b$', then the longest prefix match for 192.168.0.1 may be '11000000 $1010100000_b$'. In another example, if a match is found for $q(p_8/g)$ at $r(p_8/g)$, and the matching entry indicates no rounded-off bits, then the longest prefix match for 192.168.0.1 may be '$11000000_b$'. In another example, if a match is found for $q(p_8/g)$ at $r(p_8/g)$, and the matching entry indicates 1 rounded-off bit of '$0_b$', then no prefix match for 192.168.0.1 may exist.

Figure 5:
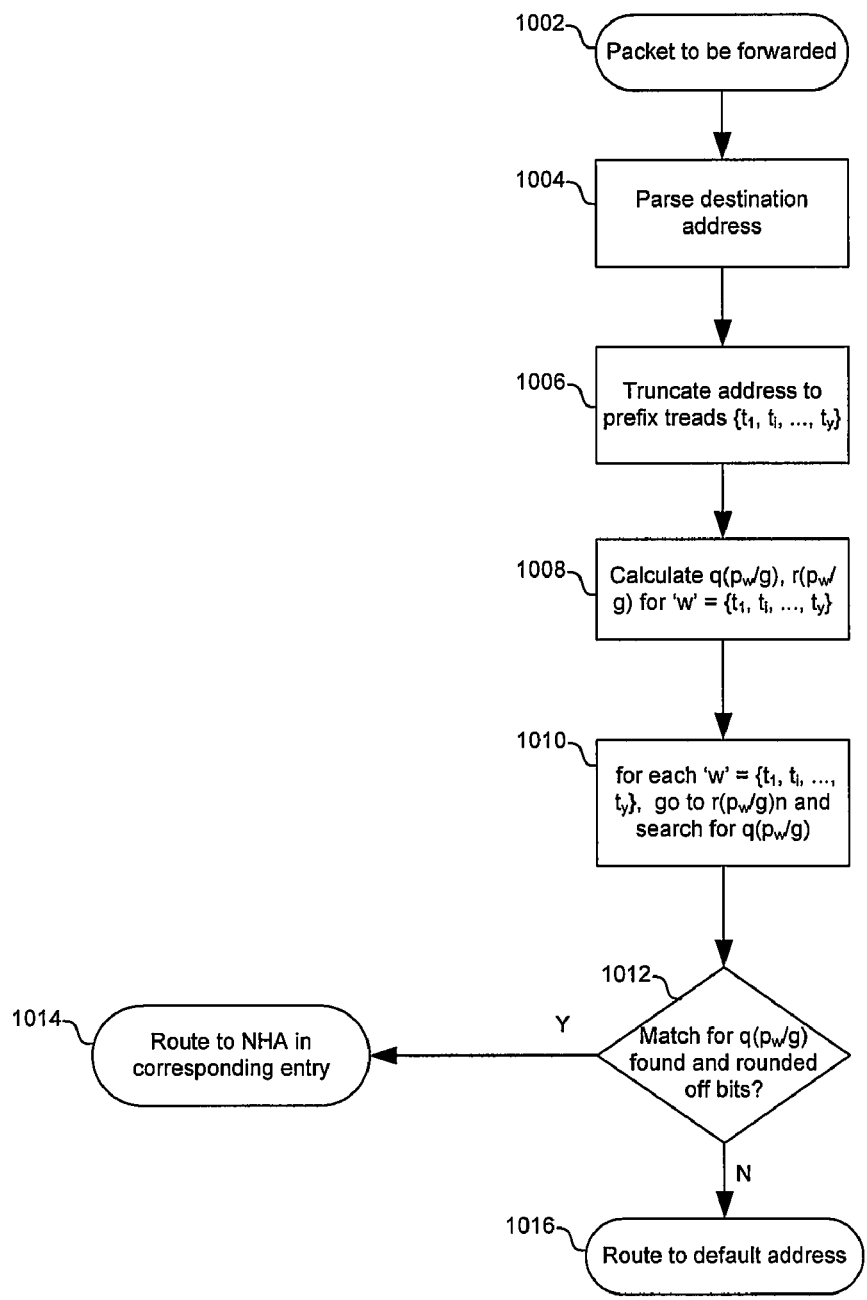
FIG. 5 is flow chart illustrating exemplary steps for routing packets in a network by finding a longest prefix match in a hash table utilizing prefix transformation and aggregation, in accordance with an embodiment of the invention.

FIG. 5 is flow chart illustrating exemplary steps for routing packets in a network by finding a longest prefix match in a hash table utilizing prefix transformation and aggregation, in accordance with an embodiment of the invention. Referring to FIG. 5, the steps may begin with step 1002, when a packet is ready to be forwarded by a network node. Subsequent to step 1002, the steps may advance to step 1004. In step 1004, the destination address of the packet may be determined. In this regard, the destination address may be determined, for example, by parsing a packet header. Subsequent to step 1004, the exemplary steps may advance to step 1006. In step 1006 the destination address may be truncated to each of a set of 'y' prefix lengths (herein referred to as treads). For example, the destination address may be truncated to 29 bits, 25 bits, 24 bits, 22 bits, 20 bits, 16 bits, 12 bits, and 8 bits as described in FIG. 3.

Accordingly, aspects of the invention may enable searching for a match to each of the 'y' prefixes. Subsequent to step 1006, the exemplary steps may advance to step 1008. In step 1008, a quotient, $q(p_t/g)$, and remainder, $r(p_t/g)$ may be calculated for each tread. Subsequent to step 1008, the exemplary steps may advance to step 1010. In step 1010 a hash table similar to the hash table 806 may be accessed to determine a longest prefix match. In this regard, the index $r(p_t/g)$ for each tread may be searched for a matching $q(p_t/g)$. Subsequent to step 1010, the steps may advance to step 1012. In step 1012, it may be determined whether a matching $r(p_t/q)$ was found at index $r(p_t/q)$. Additionally, for entries at $r(p_t/q)$ matching $q(p_t/g)$, the rounded-off bits from the destination address may be compared to a any rounded-off bits indicated by the matching entry. Accordingly, if a matching prefix is represented in the hash table, then in step 1014, the packet is routed to the next hop address comprising the matching entry. If a matching prefix is not represented in the hash table, then in step 1016, the packet may, for example, be routed to a default address or be dropped.

Figure 6A:
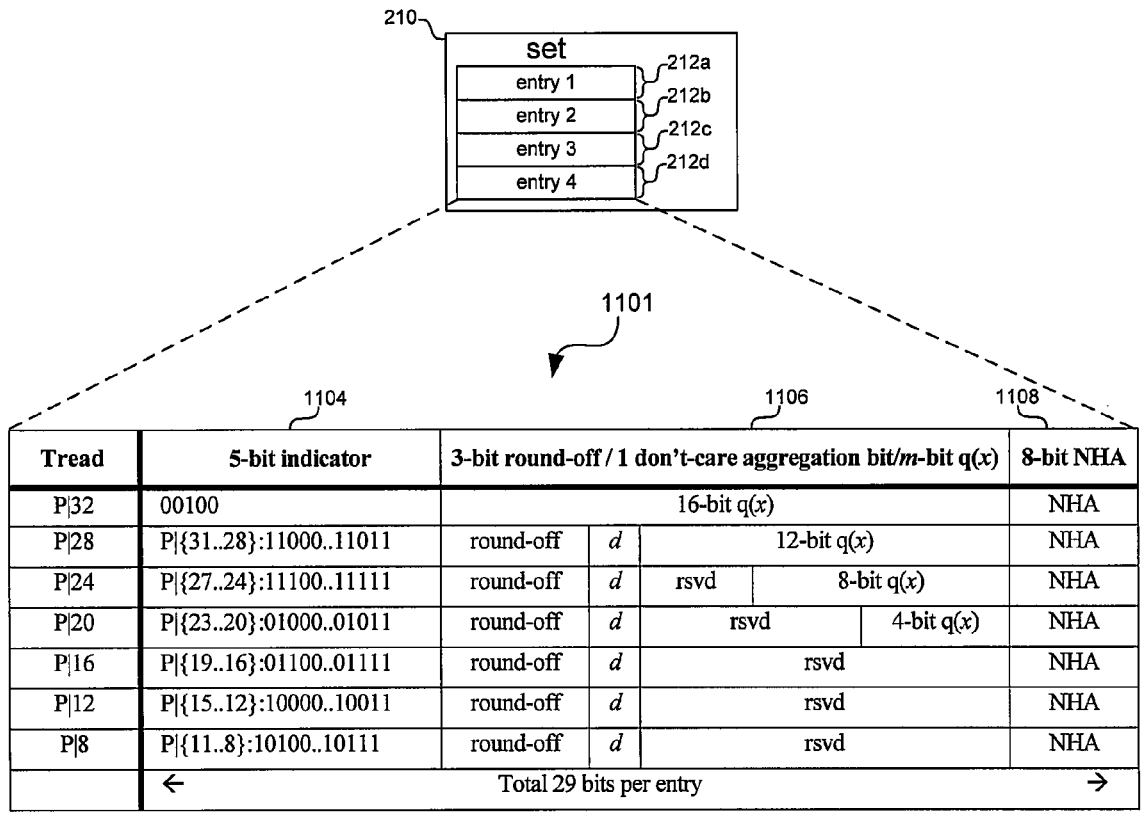
FIG. 6A illustrates the representation of multiple prefixes in a single hash table entry via a length indicator, a rounded-off bits field, and a bitmask, in accordance with an embodiment of the invention.

FIG. 6A illustrates the representation of multiple prefixes in a single hash table entry via a length indicator, a rounded-off bits field, and a bitmask, in accordance with an embodiment of the invention. Referring to FIG. 6A there is set 210 comprising a plurality of entries 212. In this regard, the set 210 may be part of a hash table such as the hash table 806 of FIG. 3. Moreover, there is shown a table 1101 illustrating possible formats for each of the entries 212. In this regard, the table 1101 depicts possible entry formats based on the tread associated with the entry. Each entry may comprise a length indicator 1104, a multi-purpose field 1106, and a next hop address 1108.

The length indicator 1104 may comprise one or more encoded bits to represent a length of a represented prefix prior to truncation. In the exemplary embodiment depicted, the field 1104 may comprise 5 bits to enable uniquely identifying 25 possible prefix lengths in an IPv4 network. Although one exemplary encoding is shown, however, the invention is not limited in this regard and many possible encodings may be utilized.

The multi-purpose field 1106 may comprise one or more of the following sub-fields: bits rounded off from a represented prefix, a bitmask utilized to aggregate two prefixes into the entry, a shortened and/or transformed prefix. In an exemplary embodiment of the invention, the shortened and/or transformed prefix may comprise a quotient calculated in a manner similar to or the same as described in FIG. 4. In this regard, for a prefix with no rounded-off bits, for example 32 bits in the illustrated embodiment, $q(p/g)$ may be used to uniquely represent a prefix. For truncated prefixes, up to 3 rounded-off bits may be stored in the field 1106. In this regard, $q(p_t/g)$ indexed by $r(p_t/g)$ may be utilized to identify the first 't' bits of a represented prefix and then the rounded-off bits may be utilized to distinguish a represented prefix from other prefixes that share the same leading 't' bits, where 't' is the tread size.

The bitmask may enable representing 2 prefixes, which differ only in their least significant bit, in a single entry. For example, the 10 bit prefix '$1111111111_b$' may be rounded down to a tread of 8 with 2 rounded-off bits equal to '$11_b$' and the 10 bit prefix '$1111111110_b$' may similarly be rounded down to a tread of 8 with two rounded-off bits equal to '$10_b$'. Accordingly, the two prefixes may be represented in a single entry by asserting the bitmask bit. In this regard, an asserted bitmask bit may indicate that the LSB of a represented prefix is a "don't care".

Although, a 3 bit rounded-off bits field is depicted, treads may be further apart and thus more rounded-off bits may be stored without deviating from the scope of the invention. Similarly, invention is not limited to storing a quotient in the field 1106. In this regard, aspects of the invention may enable storing, for example, a shortened prefix, or a prefix transformed in a different way. Additionally, increased aggregation may be achieved by utilizing bitmask comprising more than 1 bit.

The next hop address 1108 may determine a routing destination for a network node utilizing a hash table such as the hash table 206 of FIG. 2 or the hash table 806 of FIG. 3. Although an 8 bit next hop address is shown, the invention is not limited in this regard.

Figure 6B:
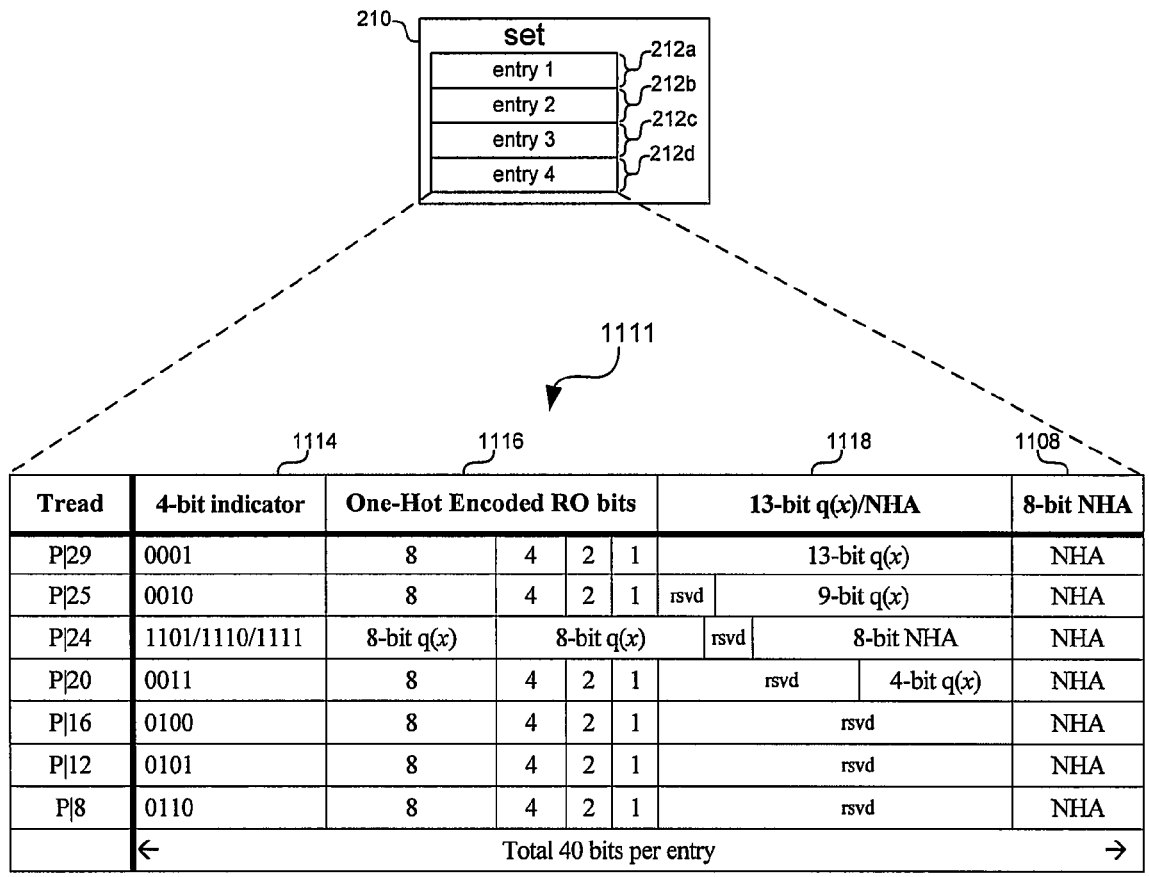
FIG. 6B illustrates the representation of multiple prefixes in a single hash table entry via a length indicator, a one-hot encoding for rounded-off bits, and/or prefix length dependant entry formatting, in accordance with an embodiment of the invention.

FIG. 6B illustrates the representation of multiple prefixes in a single hash table entry via a length indicator, a one-hot encoding for rounded-off bits, and/or prefix length dependant entry formatting, in accordance with an embodiment of the invention. Referring to FIG. 6A there is set 210 comprising a plurality of entries 212. In this regard, the set 210 may be part of a hash table such as the hash tables 206 or 806. Moreover, there is shown a table 1111 illustrating the possible formats for each of the entries 212. In this regard, the table depicts possible entry formats based on the tread associated with the entry. Each entry may comprise a length indicator 1114, a field 1116 comprising one-hot encoded rounded-off bits, a multi-purpose field 1118, and a next hop address 108.

The length indicator 1104 may comprise one or more encoded bits corresponding to a tread length utilized to transform a represented prefix. In an exemplary embodiment of the invention, the field 1114 may comprise 4 bits to enable uniquely identifying 8 treads. One exemplary encoding is shown, however, the invention is not limited in this regard and many possible encodings and/or number of treads may be utilized.

The multi-purpose field 1116 may comprise one or more one-hot encoded sub-fields which may enable representing rounded-off bit combinations. In this regard, 'z' rounded-off bits may have $2^z$ possible combinations. Accordingly, a sub-field of $2^z$ bits may be one-hot encoded to uniquely identify which rounded-off bit combinations are represented in an entry. For example, if two treads are spaced by 4 bits, then there may be 3, 2, 1, or 0 round off bits. Accordingly, an 8 bit bitmap may be utilized to uniquely identify which combinations of 3 rounded-off bits are represented by the entry. Similarly, a 4 bit bitmap may be utilized to uniquely identify which combinations of 2 rounded-off bits are represented by the entry. Similarly, a 2 bit bitmap may be utilized to uniquely identify which combinations of 1 rounded-off bit are represented by the entry. Finally a 1 bit bitmap may be utilized if a prefix with no rounded-off bits (i.e. a prefix equal in length to the tread length) is represented. Accordingly, utilizing one-hot encoded representations of rounded off bits may enable up to 15 prefixes to be represented by a single entry.

The field 1118 may comprise a shortened and/or transformed prefix. In an exemplary embodiment of the invention, field 1118 may comprise a quotient calculated in a manner similar to or the same as described in FIG. 4. In other embodiments of the invention, the field 1118 may comprise a truncated prefix, or prefix transformed in another way, without deviating from the scope of the present invention.

It may be noted that, in various embodiments of the invention, multiple length indicators may be assigned to a tread which does not aggregate prefixes of multiple lengths. In this regard a tread which may not represent prefixes of multiple lengths, such as tread 24 in the exemplary embodiment depicted, may utilize the fields 1116 and 1118 differently. For example, the fields 1116 and 1118 may be organized into two sub-entries each capable of representing a unique prefix. Accordingly, a length indicator associated with such an entry may be utilized to indicate how prefixes are represented in the entry. For example, in the encoding shown in FIG. 6B, length indicators '$1101_b$', '$1110_b$', and '$1111_b$' may respectively indicate that the first sub-entry, the second sub-entry, or both sub-entries represent a prefix.

Figure 6C:
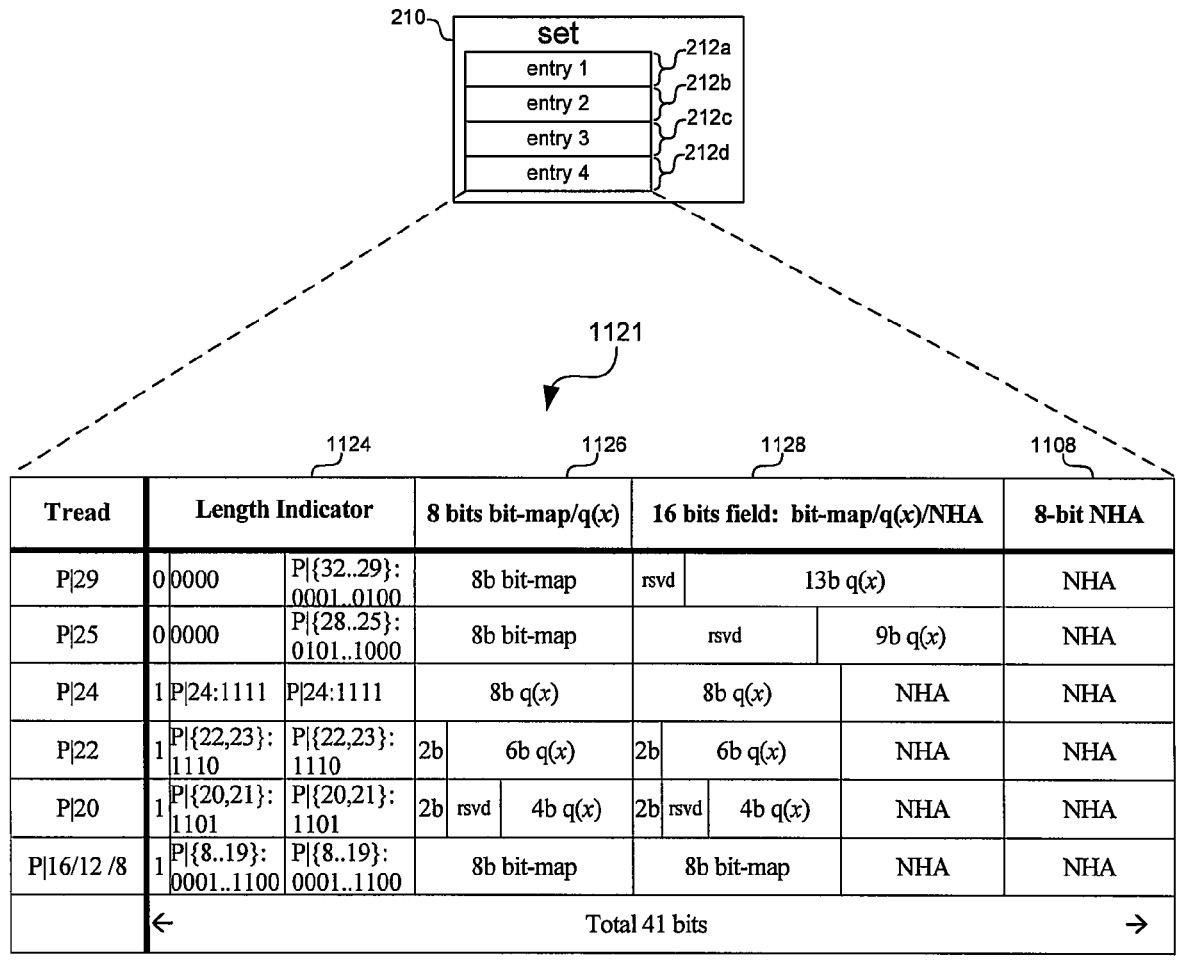
FIG. 6C illustrates the representation of multiple prefixes in a single hash table entry via one or more length indicators, a one-hot encoding for rounded-off bits, and/or prefix length dependant formatting of table entries, in accordance with an embodiment of the invention.

FIG. 6C illustrates the representation of multiple prefixes in a single hash table entry via one or more length indicators, a one-hot encoding for rounded-off bits, and/or prefix length dependant formatting of table entries, in accordance with an embodiment of the invention. Referring to FIG. 6A there is set 210 comprising a plurality of entries 212. Moreover, there is shown a table 1121 illustrating the possible formats for each of the entries 212. In this regard, the format of each entry 212 may be determined based on the tread associated with each entry 212. In this regard, the table 1121 depicts an entry format based on the tread associated with the entry. Each entry 212 may comprise a length indicator field 1124, a multi-purpose field 1126, a multi-purpose field 1128, and a next hop address 1108.

The length indicator field 1124 may comprise one or more sub-fields that may enable uniquely identifying a length of one or more prefixes represented in the entry. In this regard, one or more bits may indicate if an entry represents more than one entry. For example, a single bit may indicate if a represented prefix is longer than a critical length, in which case more than one prefix may not be represented in the allocated space. In the exemplary embodiment of the invention depicted, a 1 bit sub-field comprising the length indicator 1124 may indicate if an entry represents a prefix that is longer than 24 bits.

The length indicator 1124 may comprise one or more sub-fields that may each indicate a length of a represented prefix.

For example, for sufficiently short treads, an entry may represent multiple prefixes and thus the length indicator may comprise a sub-field for each represented prefix. In the exemplary embodiment shown, entries for treads of 24 bits and smaller are capable of representing 2 prefixes. Accordingly, the length indicator may comprise 2 sub-fields, each comprising 4 bits, such that each sub-field may uniquely identify 16 (i.e. 24–8, where 24 is longest prefix length for which an entry may represent two prefixes and 8 is the shortest prefix length in the exemplary IPv4 network) prefix lengths.

The multi-purpose field 1126 may comprise one or more sub-fields that may enable uniquely identifying rounded-off bits for each prefix represented in the entry. In this regard, the field 1126 may comprise a one-hot encoding of bits rounded-off from a represented prefix. The one-hot encoded sub-field may comprise a number of bits suitable for uniquely representing each possible combination of rounded-off bits. Accordingly, the size of the one-hot encoded sub-field may be determined based on the tread spacing. For example, for a tread spacing of 4 bits, there are at most 3 rounded-off bits and the one-hot encoded sub-field may comprise 8 bits. Similarly, if the tread spacing is 2 bits, then there is at most one rounded off bit and the one-hot encoded sub-field may comprise 2 bits. In the exemplary embodiment of the invention depicted, the one-hot encoded sub-field may comprise 8 bits for treads 29, 25, 16, 12, and 8; 2 bits for treads 20 and 22; and 0 bits for tread 24.

The multi-purpose field 1126 may comprise one or more sub-fields that may enable storing a transformed and/or shortened prefix. In the exemplary embodiment of the invention depicted, treads 24, 22, and 20 may utilize field 1126 to store a transformed prefix in the form of a quotient calculated in a manner similar to or the same as in FIG. 4. In other embodiments, the multi-purpose field 1126 may comprise a truncated prefix, or prefix transformed in another way, without deviating from the scope of the present invention.

The multi-purpose field 1128 may comprise one or more sub-fields that may enable uniquely identifying rounded-off bits for a prefix represented in the entry. In the exemplary embodiment of the invention depicted, the multi-purpose field 1128 may enable storage of an 8 bit one-hot encoded sub-field for treads 16, 12, and 8. In the exemplary embodiment of the invention depicted, the multi-purpose field 1128 may store a 2 bit one-hot encoded sub-field for treads 22, and 20. The multi-purpose field 1128 may comprise one or more sub-fields that may enable storage of a transformed prefix. In the exemplary embodiment of the invention depicted, the multi-purpose field 1128 may enable storage of a transformed prefix for the treads 29, 25, 24, 22, and 20.

The multi-purpose field 1128 may comprise one or more sub-fields that may enable storage of a next hop address. In the exemplary embodiment of the invention depicted, the multi-purpose field 1128 may enable storage of a next hop address for the treads 24, 22, 20, 16, 12, and 8.

Accordingly entries as formatted according to table 1121 may comprise sub-entries that enable representing two prefixes in a single entry. In this regard, each sub entry may comprise a length indicator sub-field, a transformed prefix (, a one-hot encoding of rounded-off bits, and/or a next hop address.

Aspects of the invention may enable aggregating prefixes of varying lengths into a single hash table, such as the hash table 806, wherein each entry in the hash table, such as the entries 212a, 212b, 212c, and/or 212d, comprises one or more encoded bits, as in the fields 1104, 1106, 1114, 1116, 1118, 1124, 1126, and/or 1128, to uniquely identify said prefixes. Additionally, an entry in the hash table may be formatted based on a length of one or more representations of said prefixes in the entry. For example, the tables 1101, 1111, and 1121 illustrate possible formats for hash table entries. Aggregating prefixes into a hash table may comprise truncating the prefixes to a common length. In this regard, the encoded bits may indicate the length of the prefixes prior to and/or subsequent to truncation, as in the tables 1101, 1111 and/or 1121. Additionally, the encoded bits may represent bits removed from the prefix during truncation. In this regard, an encoded bit may represent a possible combination of removed bits and may be asserted when the removed bits are equal to that combination.

Another embodiment of the invention may provide a machine-readable storage, having stored thereon, a computer program having at least one code section executable by a machine, thereby causing the machine to perform the steps as described herein hash table based routing via table and prefix aggregation Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A method for data processing, the method comprising:
performing by one or more processors or circuits in a network device:
aggregating prefixes of varying lengths in a hash table, wherein each entry in said hash table comprises one or more encoded bits used to uniquely identify prefixes associated with said each entry;
routing data in a network utilizing said hash table, wherein one or more of: a number of fields in said each entry in said hash table, a size of one or more fields in said each entry in said hash table, and an ordering of fields in said each entry in said hash table is controlled based on a length of said prefixes associated with said each entry.

2. The method according to claim 1, wherein:
said each entry in said hash table comprises a multi-purpose field; and
the format of said multi-purpose field for a particular entry is based on a length of one or more prefixes associated with said particular entry.

3. The method according to claim 1, wherein said aggregation comprises truncating said prefixes to a common length.

4. The method according to claim 3 wherein said encoded bits indicate a length of said prefixes prior to said truncation.

5. The method according to claim 3, wherein said encoded bits indicate a length of said truncated prefixes.

6. The method according to claim 3, wherein said encoded bits indicate rounded-off bits removed during said truncation.

7. The method according to claim 6, wherein each of said encoded bits corresponds to a possible combination of said rounded-off bits and is asserted if a corresponding combination of rounded-off bits is represented.

8. The method according to claim 3, comprising:
defining a set of 'm' prefix lengths, $l_1, \ldots, l_m$, where 'm' is a positive integer greater than 1; and
truncating prefixes longer than or equal to $l_i$ and shorter than $l_{i+1}$ to length $l_i$, wherein $l_i$ and $l_{i+1}$ represent two consecutive lengths comprising said set, and 'i' is a positive integer greater than or equal to 1 and less than said integer 'm'.

9. The method according to claim 1 comprising:
translating each of said prefixes as a coefficient set of a polynomial; and
calculating a remainder and a quotient resulting from a modulo 2 division of said polynomial by a generator polynomial.

10. The method according to claim 9, comprising representing said prefixes in said single hash table by storing said quotient in a memory location indexed by said remainder.

11. The method according to claim 9, comprising truncating each of said translated prefixes to a common length prior to said calculation of said quotient and said remainder.

12. The method according to claim 1, wherein said prefixes correspond to a network address portion of an IP address.

13. A non-transitory computer-readable medium having stored thereon, a computer program having at least one code section for processing data, the at least one code section being executable by a computer for causing the computer to perform steps comprising:
aggregating prefixes of varying lengths in a hash table, wherein each entry in said hash table comprises one or more encoded bits used to uniquely identify prefixes associated with said each entry;
routing data in a network utilizing said hash table, wherein one or more of a number of fields in said each entry in said hash table, a size of one or more fields in said each entry in said hash table, and an ordering of fields in said each entry in said hash table is controlled based on a length of said prefixes associated with said each entry.

14. The non-transitory computer-readable medium according to claim 13, wherein:
said each entry in said hash table comprises a multi-purpose field; and
the format of said multi-purpose field for a particular entry is based on a length of one or more prefixes associated with said particular entry.

15. The non-transitory computer-readable medium according to claim 13, wherein said aggregation comprises truncating said prefixes to a common length.

16. The non-transitory computer-readable medium according to claim 15, wherein said encoded bits indicate a length of said prefixes prior to said truncation.

17. The non-transitory computer-readable medium according to claim 15, wherein said encoded bits indicate a length of said truncated prefixes.

18. The non-transitory computer-readable medium according to claim 15, wherein said encoded bits indicate rounded-off bits removed during said truncation.

19. The non-transitory computer-readable medium according to claim 18, wherein each of said encoded bits corresponds to a possible combination of said rounded-off bits and is asserted if a corresponding combination of rounded-off bits is represented.

20. The non-transitory computer-readable medium according to claim 15, wherein said at least one code section comprises code that enables:
defining a set of 'm' prefix lengths, $l_1, \ldots, l_m$, where 'm' is a positive integer greater than 1; and
truncating prefixes longer than or equal to $l_i$ and shorter than $l_{i+1}$ to length $l_i$, wherein $l_i$ and $l_{i+1}$ represent two consecutive lengths comprising said set, and 'i' is a positive integer greater than or equal to 1 and less than said integer 'm'.

21. The non-transitory computer-readable medium according to claim 13 wherein said at least one code section comprises code that enables:
translating each of said prefixes as a coefficient set of a polynomial; and
calculating a remainder and a quotient resulting from a modulo 2 division of said polynomial by a generator polynomial.

22. The non-transitory computer-readable medium according to claim 21, wherein said at least one code section comprises code that enables representing said prefixes in said single hash table by storing said quotient in a memory location indexed by said remainder.

23. The non-transitory computer-readable medium according to claim 21, wherein said at least one code section comprises code that enables truncating each of said translated prefixes to a common length prior to said calculation of said quotient and said remainder.

24. The non-transitory computer-readable medium according to claim 13, wherein said prefixes correspond to a network address portion of an IP address.

25. A system for data processing, the system comprising:
one or more processors and/or circuits for use in a network device, wherein said one or more processors and/or circuits are operable to:
aggregate prefixes of varying lengths in a hash table, wherein each entry in said hash table comprises one or more encoded bits used to uniquely identify prefixes associated with said each entry;
route data in a network utilizing said hash table, wherein one or more of a number of fields in said each entry in said hash table, a size of one or more fields in said each entry in said hash table, and an ordering of fields in said each entry in said hash table is controlled based on a length of said prefixes associated with said each entry.

26. The system according to claim 25, wherein:
said each entry in said hash table comprises a multi-purpose field; and
the format of said multi-purpose field for a particular entry is based on a length of one or more representations of said prefixes associated with said particular entry.

27. The system according to claim 25, wherein said aggregation comprises truncating said prefixes to a common length.

28. The system according to claim 25, wherein said encoded bits indicate a length of said prefixes prior to said truncation.

29. The system according to claim 28, wherein said encoded bits indicate a length of said truncated prefixes.

30. The system according to claim 28, wherein said encoded bits indicate rounded-off bits removed during said truncation.

31. The system according to claim 30, wherein each of said encoded bits corresponds to a possible combination of said rounded-off bits and is asserted if a corresponding combination of rounded-off bits is represented.

32. The system according to claim 28, wherein said one or more processors are operable to:
define a set of 'm' prefix lengths, $l_1, \ldots, l_m$, where 'm' is a positive integer greater than 1; and
truncate prefixes longer than or equal to $l_i$ and shorter than $l_{i+1}$ to length $l_i$, wherein $l_i$ and $l_{i+1}$ represent two consecutive lengths comprising said set, and 'i' is a positive integer greater than or equal to 1 and less than said integer 'm'.

33. The system according to claim 25, wherein said one or more processors are operable to:
translate each of said prefixes as a coefficient set of a polynomial; and
calculate a remainder and a quotient resulting from a modulo 2 division of said polynomial by a generator polynomial.

34. The system according to claim 33, wherein said one or more processors are operable to represent said prefixes in said single hash table by storing said quotient in a memory location indexed by said remainder.

35. The system according to claim 33, wherein said one or more processors are operable to truncate each of said translated prefixes to a common length prior to said calculation of said quotient and said remainder.

36. The system according to claim 25, wherein said prefixes correspond to a network address portion of an IP address.

\* \* \* \* \*